United States Patent [19]
Li

[11] Patent Number: 5,451,926
[45] Date of Patent: Sep. 19, 1995

[54] CAR-USED BURGLARPROOF DEVICE CAPABLE OF EMITTING HUMAN VOICE

[76] Inventor: Kou Lian Li, 7th Fl., No. 70-1, Lo Yeh St., Taipei, Taiwan

[21] Appl. No.: 186,128

[22] Filed: Jan. 25, 1994

[51] Int. Cl.$^6$ ............................................. B60R 25/10
[52] U.S. Cl. .................................. 340/426; 180/287; 307/10.2; 340/429
[58] Field of Search ..................... 340/426, 429, 430; 180/287; 307/10.2

[56] References Cited

U.S. PATENT DOCUMENTS

| | | | |
|---|---|---|---|
| 4,426,691 | 1/1984 | Kawasaki | 340/460 |
| 4,924,206 | 5/1990 | Ayers | 340/426 |
| 4,975,678 | 12/1990 | Hwang | 340/426 |
| 5,113,182 | 5/1992 | Suman et al. | 340/426 |
| 5,117,217 | 5/1992 | Nykerk | 340/426 |
| 5,148,145 | 9/1992 | Tsao | 340/426 |
| 5,193,141 | 3/1993 | Zwern | 340/426 |

*Primary Examiner*—Brent Swarthout
*Attorney, Agent, or Firm*—Browdy and Neimark

[57] ABSTRACT

A car-used burglarproof device capable of emitting human voice, including a remote transmitter, a central door lock controller, a wireless SOS system, a remote receiver, a decoder, a latch circuit, a vibration detecting circuit, a counter, a timer, a voice system and a re-trigerable timer, whereby the remote transmitter is operated to transmit signal to the receiver and the receiver responds to the signal by voice or sound. When the burglarproof effect is set up or released, the car doors are simultaneously locked or unlocked. After the burglarproof effect is set up, if the car is touched or shocked, the burglarproof device will emit a voice of "this car is equipped with alarm system, please don't touch". If the car is again touched, the burglarproof device will emit a warning voice of "if you touch the car again, I shall call the police". If the car is touched for the third time, then the burglarproof device emits an alarm sound, creating scaring effect and transmits a wireless SOS signal to the owner so that the owner can stop the burglar in time or trace the missing car. In addition, at night, the burglarproof device can emit voice to inform the owner of the location of the car. The voices of the voice system is freely re-settable by the owner of the car.

2 Claims, 2 Drawing Sheets

CAR-USED BURGLARPROOF DEVICE CAPABLE OF EMITTING HUMAN VOICE

BACKGROUND OF THE INVENTION

The present invention relates to A car-used burglarproof device capable of emitting human voice, and more particularly to a burglarproof device in which when the burglarproof effect is set up or released, the burglarproof device informs the owner by voice and when the car is touched or shocked, the burglarproof device emits a warning voice or a scaring voice. In addition, the burglarproof device can emit voice to inform the owner of the location Of the car. Also, in case of emergency, the burglarproof device can continuously emit SOS signal or scaring sound. The voice is freely resettable by the owner.

A conventional car-used burglarproof device is composed of sophisticated electronic components and designed with multiple functions such as remote or previous activation of the engine and air conditioner, encoded locking, double burglarproof systems which can shut off the fuel and electricity supply in case of burglary. Also, the conventional burglarproof device can flicker at night to indicate the location of the car.

However, such electronic burglarproof device is easy to be interrupted and the stability thereof is low. Moreover, the more functions are provided, the more easily the burglarproof device fails. Especially, it tends to that the current car is equipped with computer-controlled injection engine so that when the car is additionally equipped with the burglarproof device, the original circuit is likely to be affected and the ability of the car may be lowered. Furthermore, the system of the car may fail during high speed running and the fuel and electricity supply may be shut off to cause serious accident.

Therefore, it is necessary to provide an improved car-used burglarproof device which is capable of emitting human sound to warn or scare the burglar so as to effectively avoid the burglary and eliminate the above shortcomings existing in the conventional device.

SUMMARY OF THE INVENTION

It is a primary object of the present invention to provide an improved car-used burglarproof device which is capable of emitting human sound to warn or scare the burglar so as to effectively avoid the burglary.

It is a further object of the present invention to provide the above device wherein the voice is freely resettable by the owner.

According to the above objects, the car-used burglarproof device capable of emitting human voice of the present invention includes a remote transmitter, a central door lock controller, a wireless SOS system, a remote receiver, a decoder, a latch circuit, a vibration detecting circuit, a counter, a timer, a voice system and a re-triggerable timer, whereby the remote transmitter is operated to transmit signal to the receiver and the receiver responds to the signal by voice or sound. When the burglarproof effect is set up or released, the car doors are simultaneously locked or unlocked. After the burglarproof effect is set up, if the car is touched or shocked, the burglarproof device will emit a voice of "this car is equipped with alarm system, please don't touch". If the car is again touched, the burglarproof device will emit a warning voice of "if you touch the car again, I shall call the police". If the car is touched for the third time, then the burglarproof device emits an alarm sound, creating scaring effect and transmits a wireless SOS signal to the owner so that the owner can stop the burglar in time or trace the missing car. In addition, the burglarproof device can emit voice to inform the owner of the location of the car at night. The voices of the voice system is freely re-settable by the owner of the car detachably connecting a keyboard main body and a keyboard frame of a computer keyboard so as to facilitate the service and maintenance of the keyboard main body.

The present invention can be best understood accompanying through the following description and drawing, wherein:

DETAILED DESCRIPTION OF THE PREFERRED EMBODIMENT

Figure 1:
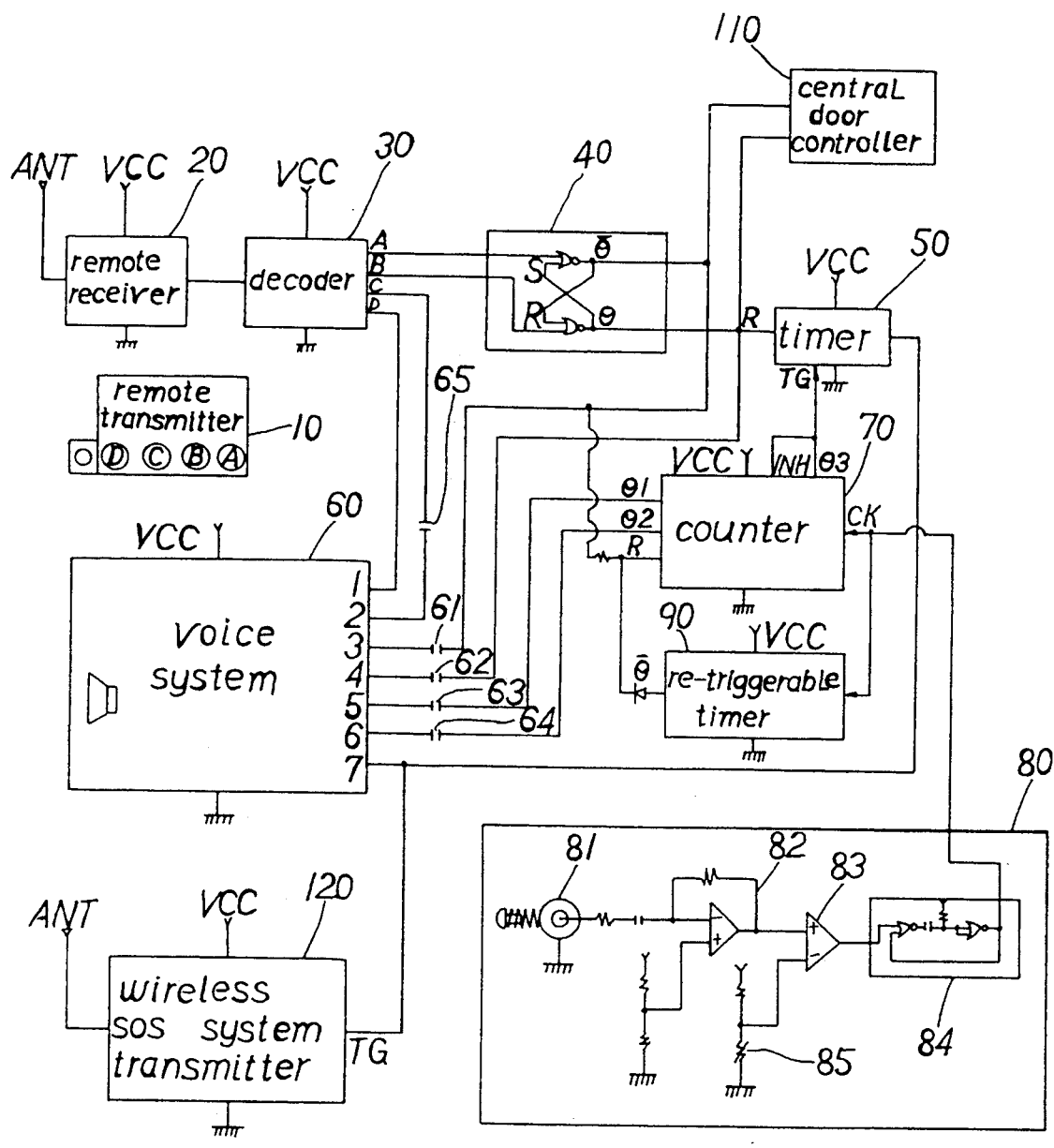
FIG. 1 is a circuit diagram of the present invention.
Figure 2:
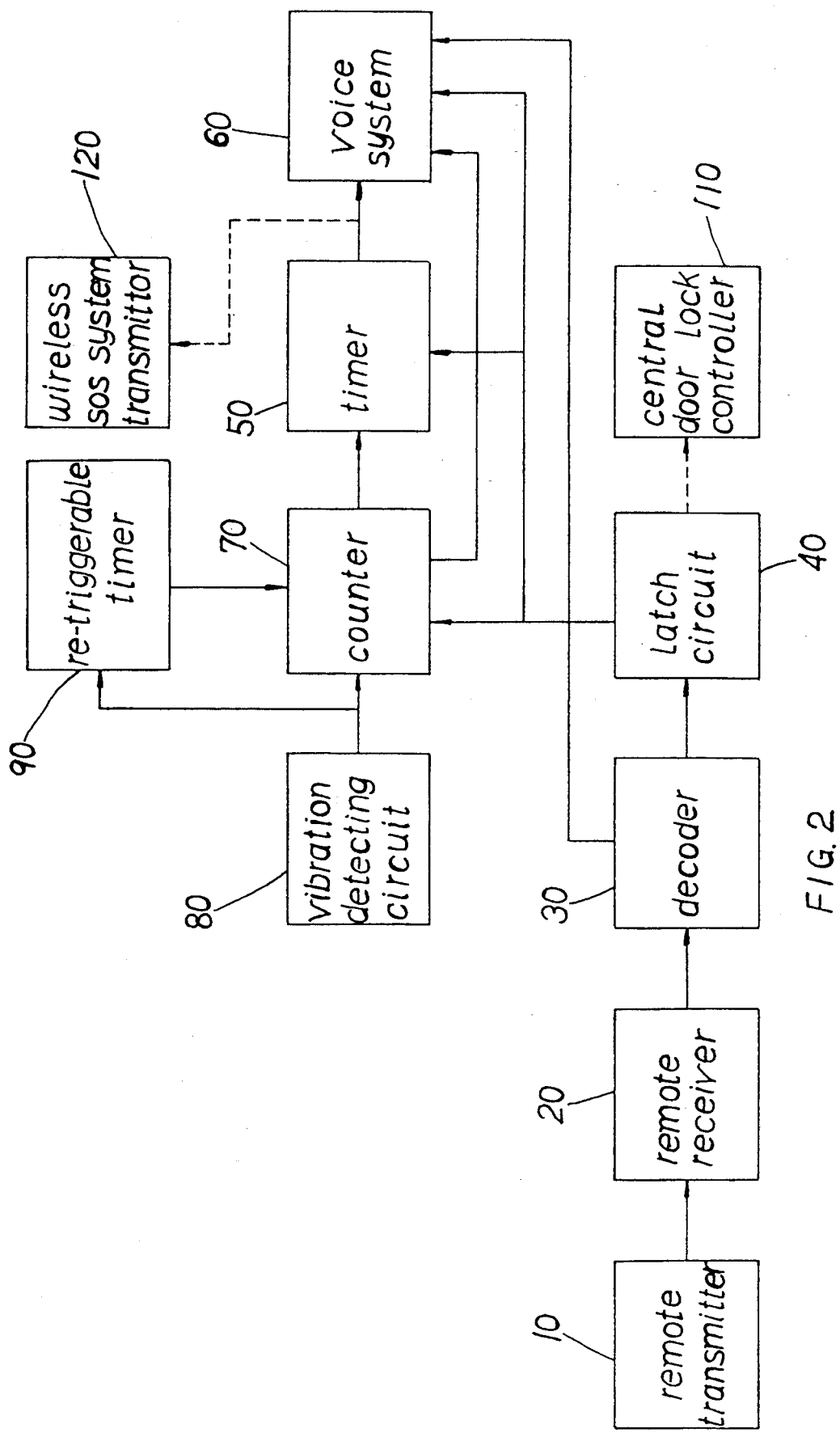
FIG. 2 is a block diagram of the present invention.

Please refer to FIGS. 1 and 2. The present invention includes a remote transmitter 10, a central door lock controller 110, a wireless SOS system 120, a remote receiver 20, a decoder 30, a latch circuit 40, a timer 50, a voice system 60, a counter 70, a vibration detecting circuit 80 and a re-triggerable timer 90.

The operation of the present invention is as follows:

1. When pressing down key A of the transmitter 10, the latch circuit 40 is set up and pin Q thereof outputs signal H which is coupled to the voice system 60 through a capacitor 62 to activate pin 4 and the voice system emits a voice of "burglarproof setting completed". The central door lock controller 110 locks the car doors and permits the timer 50 and counter 70 to receive the signal from the vibration detecting circuit 80. At this time, if the car is touched or shocked, the detecting circuit 80 will output a pulse to the re-triggerable timer 90 and pin CK of the counter 70, making pin Q1 output signal H (logic "1") which is coupled to activating pin 5 of the voice system 60 through a capacitor 63, making the voice system emit a voice of "this car is equipped with alarm system, please don't touch". If the car is again touched in 10 seconds, then pin Q2 of the counter 70 will output signal H (logic "1") which is coupled to pin 6 of the voice system through a capacitor 64, making the voice system emit a voice of "if you touch the car again, I shall call the police". If the car is touched for the third time, then pin Q3 of the counter 70 outputs a signal H to activate the timer 50, making the same output an adjustable period of time H (logic "1") to activate pin 7 of the voice system to emit an alarm sound, creating scaring effect. If the car is still touched before the alarm sound is finished, the timer 50 will re-time, making the voice system continuously emit alarm sound.

Each time the vibration detecting circuit outputs a pulse to the pin CK of the counter 70, the re-triggerable timer simultaneously triggers the counter 70. If the vibration detecting circuit does not further output pulse in 10 seconds, the counter 70 is again triggered. Pin $\theta$ thereof will output a signal H and the counter will be cleared up for re-counting. The vibration detecting circuit 80 includes a sounding plate 81 welded with a spring to which a weight is added, an amplifier 82, a comparator 83, an adjustable resistor 85 for adjusting the sensitivity and a pulse expandor 84 for avoiding error output of the counter during each vibration when the comparator outputs multiple pulses. The pulse expandor serves to combine multiple pulses during a period of time into one pulse.

2. When pressing down key B of the transmitter 10, pin θ of the latch circuit 40 outputs a signal H (logic "1") which is coupled to the voice system through the capacitor 61 to emit a voice of "released from burglarproof effect" and the timer 50 and counter 70 are shut off and no longer receive the signal from the vibration detecting circuit. Also, the central door lock controller unlocks the car doors.

3. When pressing down key C of the transmitter 10, pin C of the decoder 30 outputs a signal H (logic "1") which is coupled to pin 2 of the voice system 60 through the capacitor 65, making the voice system emit a voice of "I am here" to inform the owner of the car of the location of the car.

4. When pressing down key D of the transmitter 10, pin D of the decoder 30 outputs a signal H (logic "1") which is coupled to pin 1 of the voice system 60, making the same continuously repeatedly emit SOS voice or scaring sound. This function can be alternatively applied to the speaker of a broadcasting car or a commercial car. This function can be stopped by pressing other keys.

It is to be understood that the above description and drawings are only used for illustrating one embodiment of the present invention, not intended to limit the scope thereof. Any variation and derivation from the above description and drawings should be included in the scope of the present invention.

What is claimed is:

1. A burglarproof device for use in a vehicle capable of emitting a human voice comprising
    a remote transmitter having a plurality of control keys including a first, second, third, and fourth keys;
    a remote receiver in radio contact with said remote transmitter;
    a decoder connected to said remote receiver to determine which of said keys on said remote transmitter is being operated;
    a latch circuit connected to said decoder for activation by said first and second keys of said remote transmitter;
    a central door lock controller connected to said latch circuit for activation by said latch circuit upon operation of said first key of said remote transmitter to lock doors on the vehicle;
    a timer connected to said latch circuit;
    a counter connected to said timer;
    a re-triggerable timer connected to said counter;
    a vibration detecting circuit connected to both said counter and said re-triggerable timer;
    a wireless sos system transmitter connected to said timer;
    and a voice system connected to said decoder, said latch circuit, said counter, said central door lock controller, said timer and said wireless sos system transmitter;
    said voice system connected to announce locking of doors of the vehicle upon a signal from said central door lock controller upon activation of said central door lock controller by said latch circuit upon operation of said first key of said remote transmitter and said timer and said counter activated to enable said counter and said re-triggerable timer to receive a signal from said vibration detecting circuit upon vibratory movement of said vehicle wherein said voice system receives a signal from said re-triggerable timer through said counter to issue a first audible voice warning, further vibratory movement detected by said vibration detecting circuit connected to send a second signal through said counter to said voice system to issue a second audible voice warning, an additional vibratory movement detected by said vibration detecting circuit connected to send a third signal through said counter to said timer to said voice system to sound an alarm sound after a predetermined time set by said timer, upon still another vibratory movement detected by said vibration detecting circuit before the alarm sound is finished sounding, said voice system controlled through said timer will emit a continuous alarm sound;
    said voice system connected for control through said decoder upon operation of said second key of said remote transmitter to emit voice confirmation of deactivation of burglarproof effect wherein said timer and counter are shut off from receiving a signal from said vibration detecting circuit;
    said voice system connected for control through said decoder upon operation of said third key of said remote transmitter to emit voice aid to locate the vehicle;
    and said voice system connected for control through said decoder upon operation of said fourth key of said remote transmitter to repeatedly emit voice calls through said wireless sos system transmitter.

2. The burglarproof device of claim 1 wherein
    a sequence comprising said first audible voice warning, said second audible voice warning, and said alarm sound is freely resettable by the owner.

* * * * *